(12) United States Patent
Lin

(10) Patent No.: US 6,799,229 B1
(45) Date of Patent: Sep. 28, 2004

(54) DATA-BURST-COUNT-BASE RECEIVE FIFO CONTROL DESIGN AND EARLY PACKET DISCARD FOR DMA OPTIMIZATION

(75) Inventor: Liang-i Lin, Sunnyvale, CA (US)

(73) Assignee: LSI Logic Corporation, Milpitas, CA (US)

(*) Notice: Subject to any disclaimer, the term of this patent is extended or adjusted under 35 U.S.C. 154(b) by 562 days.

(21) Appl. No.: 09/654,952

(22) Filed: Sep. 5, 2000

(51) Int. Cl.[7] .............................................. G06F 13/00
(52) U.S. Cl. ................................ 710/52; 710/4; 710/7; 710/36; 710/54; 710/56
(58) Field of Search ........................... 710/4, 7, 36, 52, 710/54, 56

(56) References Cited

U.S. PATENT DOCUMENTS 5,136,582 A * 8/1992 Firoozmand ................ 370/400
6,317,418 B1 * 11/2001 Raitola et al. .............. 370/278
6,457,000 B1 * 9/2002 Witkowski et al. ............ 707/2
6,502,157 B1 * 12/2002 Batchelor et al. ........... 710/310

* cited by examiner

Primary Examiner—Fritz Fleming
Assistant Examiner—Mohammad O. Farooq
(74) Attorney, Agent, or Firm—Trexler, Bushnell, Giangiorgi & Blackstone, LTD

(57) ABSTRACT

A system which includes a DMA (Direct Memory Access) interface and a MAC (Media Access Control) interface. A data FIFO and data burst information FIFO are disposed between the DMA interface and the MAC interface, and the system is configured to provide that information contained in the data burst information FIFO is used to discard unwanted data contained in the data FIFO, such that the unwanted data does not forward to the DMA interface. This facilitates fast and efficient data transfer, and avoids wasting (i.e. optimizes) DMA bandwidth. Additionally, this avoids or at least reduces the likelihood of FIFO overflow.

14 Claims, 2 Drawing Sheets

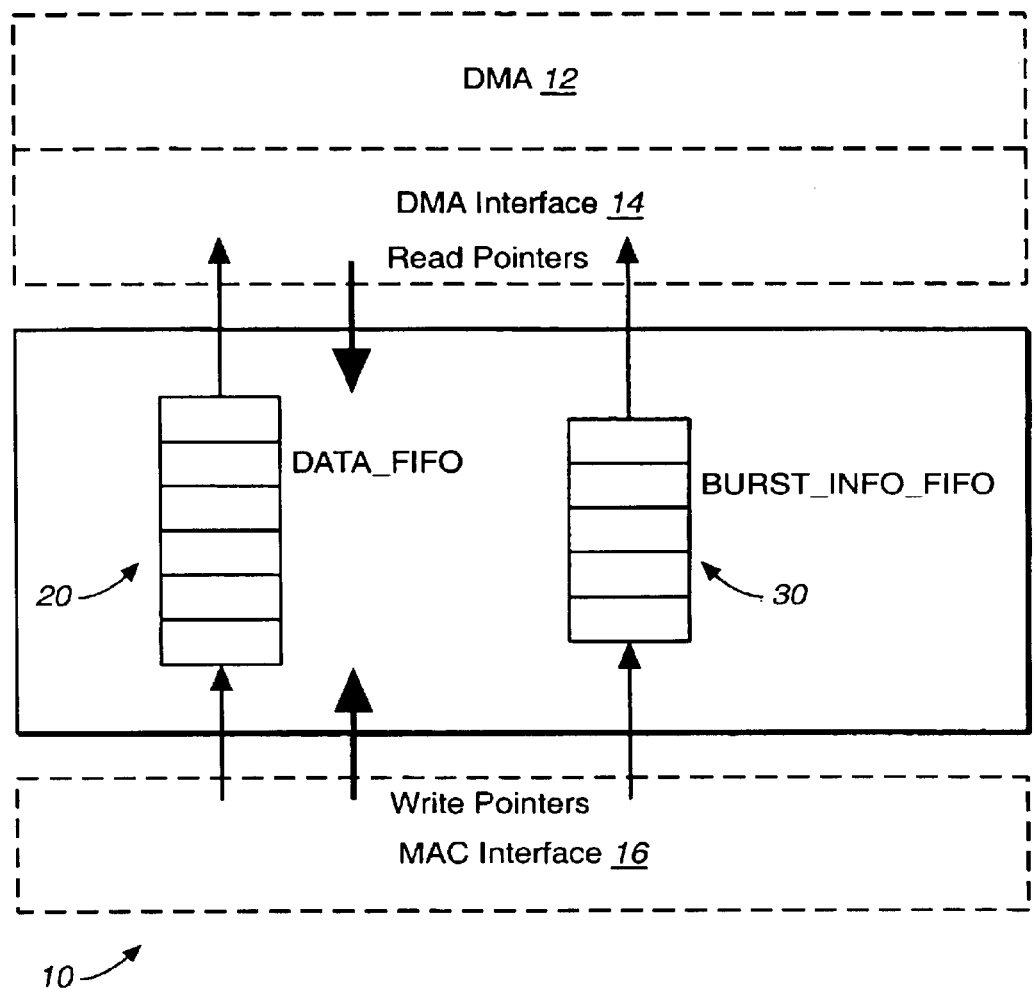
FIG._1

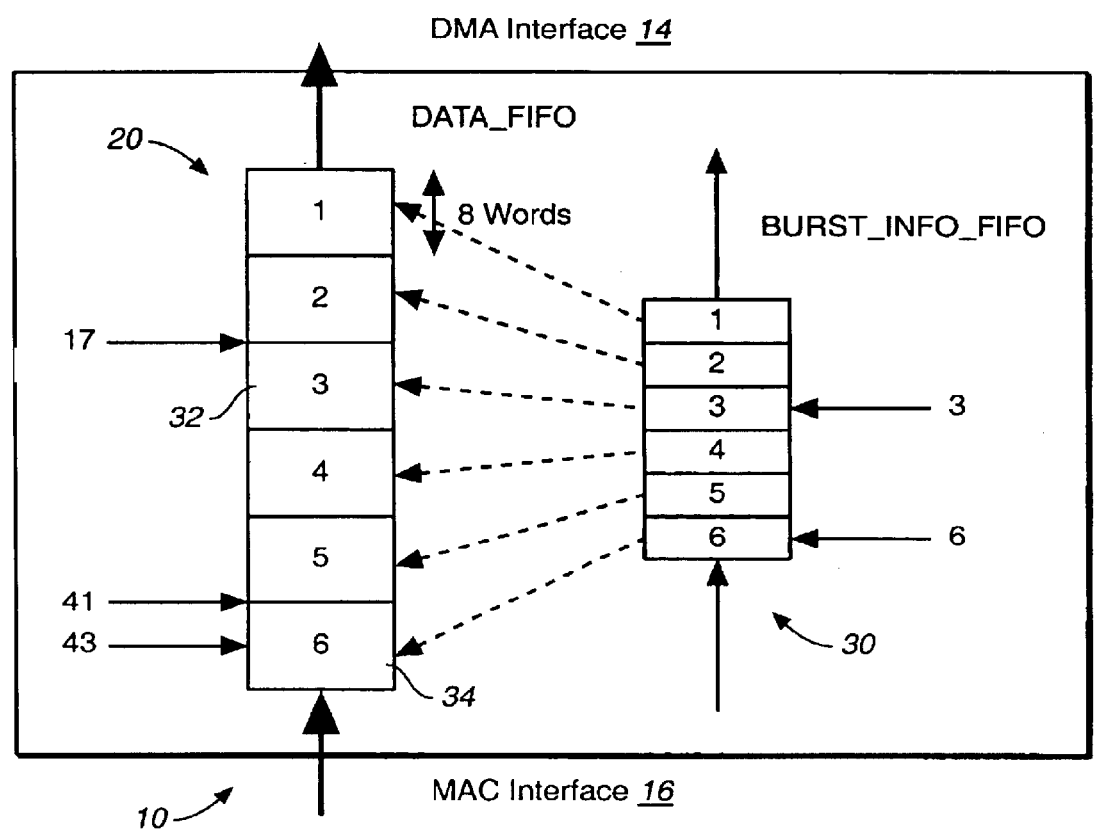
FIG._2

DATA-BURST-COUNT-BASE RECEIVE FIFO CONTROL DESIGN AND EARLY PACKET DISCARD FOR DMA OPTIMIZATION

FIELD OF THE INVENTION

The present invention relates generally to FIFO control logic, and more specifically relates to FIFO control logic which is configured to avoid forwarding unwanted data to the DMA.

BACKGROUND OF THE INVENTION

DMA (Direct Memory Access) is a technique for transferring data from main memory to a device without passing it through a CPU. This is useful, for example, for making quick backups and for real-time applications. Generally, computers that have DMA channels can transfer data to and from devices much more quickly than computers which do not have DMA channels.

While a circuit-switching protocol is ideal when data must be transmitted quickly and must arrive in the same order in which the data is sent (such as with live audio and video), packet-switching is more efficient and robust for data that can withstand some delays in transmission, such as e-mail messages and Web pages. In a packet-switching protocol, a message is divided into packets, and the packets are sent to the destination. A packet typically contains the destination address in addition to the data. Each packet is transmitted individually and can even follow different routes to its destination. Once all the packets forming a message arrive at the destination, they are recompiled into the original message. Many modern Wide Area Network (WAN) protocols, including TCP/IP, X.25, and Frame Relay, are based on packet-switching technologies.

To have fast and efficient data transfer, it is important not to waste DMA bandwidth. However, in the prior art, FIFO control logic is configured to forward all data that is received to the DMA. Hence, in some cases, unwanted data is forwarded to the DMA, and DMA bandwidth is wasted. Additionally, because all packets which are received by the FIFO are forwarded to the DMA, the FIFO is likely to overflow.

OBJECTS AND SUMMARY

It is an object of an embodiment of the present invention to provide a system which is configured to prevent the forwarding of unwanted data to a DMA, thereby optimizing DMA bandwidth.

Another object of an embodiment of the present invention is to provide a system which avoids the unnecessary overflow of a FIFO.

Still another object of an embodiment of the present invention is to provide a system which employs data-burst-count control logic to manage a FIFO, such that discarded packets in the FIFO are not forwarded to a DMA.

Briefly, and in accordance with at least one of the foregoing objects, an embodiment of the present invention provides a system which includes a DMA (Direct Memory Access) interface and a MAC (Media Access Control) interface. A data FIFO and data burst information FIFO are disposed between the DMA interface and the MAC interface, and the system is configured to provide that information contained in the data burst information FIFO is used to discard unwanted data contained in the data FIFO, such that the unwanted data does not forward to the DMA interface. As such, DMA bandwidth is optimized and overflow is prevented.

BRIEF DESCRIPTION OF THE DRAWINGS

The present invention and the advantages thereof will become more apparent upon consideration of the following detailed description when taken in conjunction with the accompanying drawings of which:

FIG. 1 is a schematic illustrating a DMA (Direct Memory Access) interface, a MAC (Media Access Control) interface, and a data FIFO and data burst information FIFO disposed therebetween; and FIG. 2 is a schematic similar to FIG. 1, showing the data FIFO receiving a packet, and showing the values of write pointers of the data FIFO and data burst information FIFO.

DESCRIPTION

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

FIG. 1 illustrates a system 10 which includes a DMA (Direct Memory Access) 12, a DMA (Direct Memory Access) interface 14 and a MAC (Media Access Control) interface 16. As shown, a data FIFO 20 and a data burst information FIFO 30 are disposed between the interfaces 14 and 16. As discussed above, prior art systems provide that data in the data FIFO is forwarded to the DMA even if the packet has become unwanted. As will be described more fully later herein, the system 10 illustrated in FIG. 1 is configured to provide that information which is contained in the data burst information FIFO 30 is used to discard unwanted data contained in the data FIFO 20, such that the unwanted data does not forward to the DMA interface 14 and to the DMA 12. This avoids wasting (i.e. optimizes) DMA bandwidth, and avoids or at least reduces the likelihood of FIFO overflow.

In the system 10 shown in FIG. 1, the MAC interface 16 is configured to act as master, and the DMA interface 14 is configured to act as slave. Specifically, the MAC interface 16 writes packet data into the data FIFO 20, generates control information for the DMA interface 14 and writes burst information (e.g., start of packet, word count, buffer index information, etc.) into the data burst information FIFO 30. The data burst information is typically generated when the MAC interface 16 finishes loading a data burst into the data FIFO 20. When the data burst information FIFO 30 is not empty, the DMA interface 14 uses the information stored in the data FIFO 20 and data burst information FIFO 30 to communicate with the DMA 12 and move the read pointers for both FIFO's 20 and 30. The MAC interface 16 is configured to effectively remove unwanted data (in the data FIFO 20) and corresponding data burst information (in the data burst information FIFO 30) which have not been used by the DMA interface 14. Specifically, the MAC interface 16 preferably includes control logic which is configured to recover the write pointers relating to the two FIFO's 20 and 30 to avoid unnecessary DMA activity when a packet discard occurs, and does so without interrupting DMA interface logic. This recovery of write pointers will be described more fully with reference to FIG. 2.

FIG. 2 shows the same system 10 and is very similar to FIG. 1, but shows the data FIFO 20 receiving a packet, and shows the values of write pointers of the data FIFO 20 and data burst information FIFO 30. In the example shown in FIG. 2, the data FIFO 20 has received a packet which starts at burst #3 (32) and ends at burst #6 (34), wherein there are eight words (or some other pre-determined number of words which is the maximum word length allowed by the DMA interface 14) in bursts 3–5 and two words in burst #6. When it is determined the crc (cyclic redundancy check—a common technique for detecting data transmission errors) is "bad", it is desirable to discard the packet after it is finished being received by the data FIFO 20. When the data FIFO 20 is receiving a packet, a burst counter in the MAC interface 16 counts how many bursts for the current packet are in the data FIFO 20. Additionally, for each burst, there is a word counter in the MAC interface 16 which counts how many words are in each burst wherein only the last burst's word count can be less than eight (or some other pre-determined number defined by the maximum word size allowed by the DMA interface 14). In the case shown in FIG. 2, at the end of the packet, the write pointer for the data FIFO 20 is 43, and the write pointer for the data burst information FIFO 30 is 6. The burst counter for the packet is 3, and the word counter for the current burst is 2. The MAC interface 16 is configured to recover the data burst information FIFO write pointer to 6−3=3, and is configured to recover the data FIFO write pointer to 43−(2+3*8)=17. In other words, the MAC interface (i.e. control logic) 16 is configured to reduce the data burst information FIFO write pointer (initially 6 in the example shown in FIG. 2) by the value of the burst counter (3 in the example shown in FIG. 2). Additionally, the MAC interface (i.e. control logic) 16 is configured to reduce the data FIFO write pointer (initially 43 in the example shown in FIG. 2) by a quantity equal to the value of the word counter for the current burst (2 in the example shown in FIG. 2 —the word count of the last burst (burst #6) in the packet and by a quantity equal to the value of the burst counter for the packet (3 in the example shown in FIG. 2) times 8 (or some other pre-determined number defined by the maximum word size allowed by the DMA interface 14).

By recovering the write pointers for both FIFO's 20 and 30, the discarded packet data and control information relating thereto is effectively "removed." Hence, the data and corresponding data burst information will not be read by the DMA interface 14. As a result, DMA bandwidth is not wasted (i.e. DMA bandwidth is optimized). Additionally, space is freed up in the FIFO's 20 and 30 for subsequent packets. Hence, there is more margin to prevent the FIFO's 20 and 30 from overflowing. Not only does the system 10 described hereinabove improve DMA performance because of the way in which discarded packets are handled, but the system can also be used to design for different high speed applications with minimal modification.

While an embodiment of the present invention is shown and described, it is envisioned that those skilled in the art may devise various modifications of the present invention without departing from the spirit and scope of the appended claims.

What is claimed is:

1. A FIFO control system for DMA (Direct Memory Access) memory, said control system comprising: a DMA interface; a MAC (Media Access Control) interface; a data FIFO disposed between the DMA interface and the MAC interface: a data burst information FIFO disposed between the DMA interface and the MAC interface, control logic configured to use information contained in the data burst information FIFO to discard unwanted data contained in the data FIFO, such that the unwanted data does not forward to the DMA interface.

2. A FIFO control system as recited in claim 1, said control logic configured to recover write pointers of said data FIFO and said data burst information FIFO, thereby providing that said unwanted data contained in the data FIFO is not forwarded from the data FIFO and the data burst information FIFO to the DMA interface.

3. A FIFO control system as recited in claim 1, said control logic configured to recover a write pointer of said data burst information FIFO by subtracting a value of a burst counter relating to a packet of data stored in said data FIFO from a current value of said write pointer of said data burst information FIFO.

4. A FIFO control system as recited in claim 1, said control logic configured to recover a write pointer of said data FIFO by subtracting a value of a word counter of a current burst written into said data FIFO from a current value of said write pointer of said data FIFO.

5. A FIFO control system as recited in claim 4, said control logic configured to recover the write pointer of said data FIFO by also subtracting from the write pointer a quantity equal to a value of a burst counter for a packet of data stored in the data FIFO times a pre-determined number.

6. A FIFO control system as recited in claim 5, wherein the pre-determined number is a number corresponding to a maximum word count allowed by said DMA interface.

7. A FIFO control system comprising: a DMA (Direct Memory Access) interface; a MAC (Media Access Control) interface; a data FIFO disposed between the DMA interface and the MAC interface; a data burst information FIFO disposed between the DMA interface and the MAC interface, control logic configured to use information contained in the data burst information FIFO to discard unwanted data contained in the data FIFO, such that the unwanted data contained in the data FIFO does not forward to the DMA interface, said control logic configured to recover write pointers of said data FIFO and said data burst information FIFO, thereby providing that said unwanted data contained in the data FIFO is not forwarded from the data FIFO to the DMA interface, said control logic configured to recover a write pointer of said data burst information FIFO by subtracting a value of a burst counter relating to a packet of data stored in said data FIFO from a current value of said write pointer of said data burst information FIFO, said control logic configured to recover write pointer of said data FIFO by subtracting a value of a word counter of a current burst written into said data FIFO from a current value of said write pointer of said data FIFO and by subtracting from the write pointer a quantity equal to a value of a burst counter for a packet of data stored in the data FIFO times a pre-determined number, wherein the pre-determined number is a number corresponding to a maximum word count allowed by said DMA interface.

8. A method of preventing unwanted data from being forwarded to a DMA (Direct Memory Access) interface from a MAC (Media Access Control) interface, wherein a data FIFO is disposed between the DMA interface and the MAC interface, and a data burst information FIFO is disposed between the DMA interface and the MAC interface, said method comprising using information contained in the data burst information FIFO to discard unwanted data contained in the data FIFO, such that the unwanted data does not forward to the DMA interface.

9. A method as recited in claim 8, further comprising recovering write pointers of said data FIFO and said data burst information FIFO.

10. A method as recited in claim 8, further comprising recovering a write pointer of said data burst information FIFO by subtracting a value of a burst counter relating to a packet of data stored in said data FIFO from a current value of said write pointer of said data burst information FIFO.

11. A method as recited in claim 8, further comprising recovering a write pointer of said data FIFO by subtracting a value of a word counter of a current burst written into said data FIFO from a current value of said write pointer of said data FIFO.

12. A method as recited in claim 11, further comprising recovering the write pointer of said data FIFO by also subtracting from the write pointer a quantity equal to a value of a burst counter for a packet of data stored in the data FIFO times a pre-determined number.

13. A method as recited in claim 12, wherein the pre-determined number is a number corresponding to a maximum word count allowed by said DMA interface.

14. A method of preventing unwanted data from being forwarded from a MAC (Media Access Control) interface to a DMA (Direct Memory Access) interface, wherein a data FIFO is disposed between the MAC interface and DMA interface and a data burst information FIFO is disposed between the MAC interface and DMA interface, said method comprising using information contained in the data burst information FIFO to discard unwanted data contained in the data FIFO, such that the unwanted data contained in the data FIFO does not forward to the DMA interface, recovering write pointers of said data FIFO and said data burst information FIFO, thereby providing that said unwanted data contained in the data FIFO is not forwarded from the data FIFO to the DMA interface, recovering a write pointer of said data burst information FIFO by subtracting a value of a burst counter relating to a packet of data stored in said data FIFO from a current value of said write pointer of said data burst information FIFO, and recovering a write pointer of said data FIFO by subtracting a value of a word counter of a current burst written into said data FIFO from a current value of said write pointer of said data FIFO and by subtracting from the write pointer a quantity equal to a value of a burst counter for a packet of data stored in the data FIFO times a pre-determined number, wherein the pre-determined number is a number corresponding to a maximum word count allowed by said DMA interface.

* * * * *